US008808776B2

(12) United States Patent
North et al.

(10) Patent No.: US 8,808,776 B2
(45) Date of Patent: Aug. 19, 2014

(54) PRODUCE CHAMBER WITH INFLATABLE BALLOON SEAL

(76) Inventors: Scott Andrew North, Karaleee (AU); Gary Martin North, Karalee (AU)

(*) Notice: Subject to any disclaimer, the term of this patent is extended or adjusted under 35 U.S.C. 154(b) by 612 days.

(21) Appl. No.: 13/121,850

(22) PCT Filed: Sep. 30, 2009

(86) PCT No.: PCT/AU2009/001300
§ 371 (c)(1),
(2), (4) Date: Jun. 13, 2011

(87) PCT Pub. No.: WO2010/037170
PCT Pub. Date: Apr. 8, 2010

(65) Prior Publication Data
US 2011/0244097 A1 Oct. 6, 2011

Related U.S. Application Data

(60) Provisional application No. 61/101,199, filed on Sep. 30, 2008.

(51) Int. Cl.
*A23B 7/144* (2006.01)
*A23B 7/148* (2006.01)
*A23B 7/152* (2006.01)
*A23L 1/00* (2006.01)
*A23L 3/34* (2006.01)
*A23L 3/3409* (2006.01)
*A23L 3/3418* (2006.01)
*A23L 3/36* (2006.01)
*F25D 13/06* (2006.01)
*F25D 17/04* (2006.01)
*F25D 17/06* (2006.01)
*F25D 25/00* (2006.01)
*F25D 31/00* (2006.01)

(52) U.S. Cl.
USPC ........... 426/418; 426/312; 426/316; 426/419; 62/62; 62/407; 62/378; 99/473; 99/474; 99/475; 454/174; 454/903

(58) Field of Classification Search
CPC .......... A23N 15/00; A23N 15/06; F25D 1/00; F25D 25/13; F25D 13/06; F25D 13/067; F25D 17/00; F25D 17/005; F25D 17/04; F25D 17/042; F25D 17/045; F25D 17/06; F25D 25/00; F25D 25/005; F25D 2317/066; F25D 25/0664; A23B 7/00; A23B 7/04; A23B 7/14; A23B 7/144; A23B 7/148; A23L 3/34; A23L 3/3409; A23L 3/3418; A23L 3/36; A23L 3/361
USPC ......... 426/118, 132, 133, 312, 316, 324, 395, 426/404, 418, 419, 809; 99/467, 473, 474, 99/475, 476; 454/178, 180, 182, 263, 296, 454/305, 903; 62/62, 407, 378; 34/105, 34/381, 242, 417
See application file for complete search history.

(56) References Cited

U.S. PATENT DOCUMENTS 5,575,714 A * 11/1996 Rijs ............................. 454/174
2007/0017233 A1 1/2007 Hawkins

*Primary Examiner* — Rena L Dye
*Assistant Examiner* — Danny Chen
(74) *Attorney, Agent, or Firm* — Rothwell, Figg, Ernst & Manbeck, P.C.

(57) ABSTRACT

A produce chamber (1) is provided to subject produce in a crate (7) to a controlled atmosphere. The chamber (1) has at least one inflatable/deflatable balloon seal structure (15) for sealingly engaging with a side wall of a produce crate (7) which has at least one opening (13) in a side wall (11) thereof. The balloon seal structure (15) has at least one discharge opening (19) that aligns with the at least one crate opening (13). Crates (7) with produce therein can be loaded in the chamber (1) with the balloon seal structure (15) deflated. The balloon seal structure (15) can then be inflated and controlled atmosphere allowed to circulate through the balloon seal structure (15) and discharged from the opening (19) and through the crate opening (13) to expose the produce to a controlled atmosphere.

12 Claims, 6 Drawing Sheets

PRODUCE CHAMBER WITH INFLATABLE BALLOON SEAL

CROSS REFERENCE TO RELATED APPLICATIONS

This application is a 35 U.S.C. §371 National Phase Entry Application from PCT/AU2009/001300, filed Sep. 30, 2009, and designating the United States, which claims claims benefit of U.S. provisional application No. 61/101,199 filed on Sep. 30, 2008, which is incorporated herein by reference in its entirety.

FIELD OF THE INVENTION

The present invention relates to a produce chamber and method for subjecting produce in produce crates to a controlled atmosphere and has particular although not exclusive application for banana ripening.

BACKGROUND

Produce chambers have been known for subjecting produce in produce crates to controlled atmosphere. Typically, the produce is held in produce crates and controlled atmosphere is introduced into the chamber and allowed to expose the produce in the produce crates to the controlled atmosphere. The produce crates typically have openings in the side walls to allow the controlled atmosphere to reach all of the produce within the crates. Efficient flow of controlled atmosphere through the crates is not always guaranteed. In some cases, produce may escape exposure to the controlled atmosphere because of the way in which the controlled atmosphere is passed to the crates. Further, it is known that crates can be stacked in multiple height tiers within chambers and that a blind or tarp like curtain is placed over each layer to control the way in which the controlled atmosphere passes through the crates in each layer. A typical example of a produce chamber of the latter type is disclosed in our U.S. Pat. No. 5,041,298.

STATEMENT OF INVENTION

It is desirable that there be a more efficient way to ensure that the controlled atmosphere passes through the produce crates.

Therefore according to a first aspect of the invention there is provided a produce chamber for subjecting produce in a produce crate to a controlled atmosphere, said chamber comprising:

at least one inflatable/deflatable balloon seal means for sealingly engaging with a side wall of a produce crate, the produce crate having at least one opening in the side wall to allow controlled atmosphere to be introduced to the produce crate, the balloon seal means having at least one atmosphere discharge opening therein to align with the at least one opening in the produce crate when the produce crate is located in the chamber;

the balloon seal means being arranged so that when a product crate with produce therein is to be introduced into the chamber, the balloon seal means can be deflated, the produce crate located in the chamber, and then the balloon seal means inflated and controlled atmosphere allowed to discharge into the chamber through the balloon seal means, so that the balloon seal means will inflate and seal against the side wall of the produce crate and so that the controlled atmosphere can be discharged from the at least one discharge opening through the at least one opening in the side wall of the produce crate to expose produce therein to the controlled atmosphere; and an atmosphere circulating means for circulating controlled atmosphere away from the produce crate, wherein the balloon seal means comprises at least two upright extending elongate socks spaced apart by the width of a produce crate so that when a plurality of produce crates are located in the chamber, one sock will engage with side walls of corners of two adjacent produce crates, and wherein each sock comprises at least two discharge openings, each discharge opening being for a respective one of the two adjacent produce crates.

In an example, the chamber employs multiple tiers of produce crates without the need to use a blind or tarp-like curtain between each layer.

In one example, the plurality of upright elongate socks are positioned adjacent a wall in said chamber, said wall acting as a reactive surface for the upright socks to inflate against and to permit an inflating sealing force to be applied from the upright socks to the side walls of the produce crates.

According to a further aspect of the present invention there is provided a method of subjecting produce to a controlled atmosphere in a produce chamber comprising:

locating produce in a produce crate in said chamber;

inflating an inflatable/deflatable balloon seal means comprising at least two upright extending elongate socks to engage and seal with a side wall of the produce crate, said at least two elongate socks being spaced apart by the width of a produce crate so that when a plurality of produce crates are located in the chamber, one sock will engage with side walls of corners of two adjacent produce crates, and wherein each sock comprises at least two discharge openings, each discharge opening being for a respective one of the two adjacent produce crates;

allowing controlled atmosphere to pass into the balloon seal means and through the discharge openings therein and then through an aligned opening in a side wall of said produce crate to expose the produce therein to said controlled atmosphere;

circulating controlled atmosphere away from the produce crate; and deflating the balloon seal means to break the seal with the side wall of the produce crate and subsequently removing the produce crate and produce from the chamber.

BRIEF DESCRIPTION OF THE DRAWINGS

In order that the invention can be more clearly ascertained, examples of embodiments of the invention will now be described with reference to the accompanying drawings wherein.

DETAILED DESCRIPTION

Figure 1:
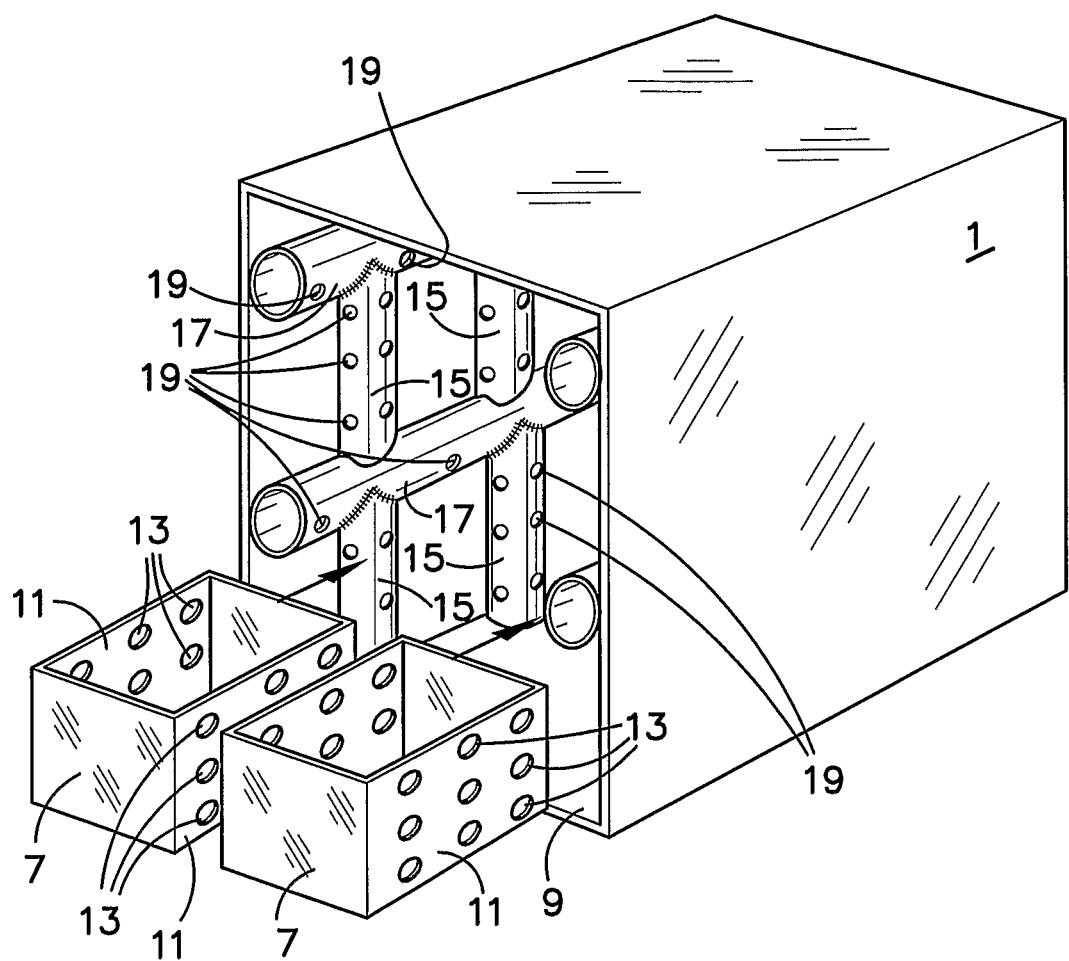
FIG. 1 is a diagrammatic perspective view of an example of an embodiment of a produce chamber.

Referring initially to FIGS. 1-5, there is shown a produce chamber 1 of generally rectangular configuration with access doors 3 at one end, and a controlled atmosphere circulating means 5 at the other end. In this example, the produce chamber 1 has a width sufficient to enable two rows of produce crates 7 to be placed on the floor 9 directly opposite one another. FIG. 1 shows that the produce crates 7 can enter the chamber 1 through the open end that is closed by the doors 3. The chamber 1 has a sufficient height, in this example, to allow two tiers of produce crate 7 to be stacked within the chamber 1, one above the other. FIG. 1 does not show the upper tier of crates 7 in order to aid clarity, however, FIGS. 2 and 3 clearly show the arrangement for two tiers.

FIG. 1 shows that the crates 7 have side walls 11 that have at least one opening 13 therein. In this example, there are multiple openings 13 on each opposite side wall 11 of the crates. The end walls of the crates are shown solid but they may contain similar openings 13. The tops of the crates are open to allow produce to be stacked therein. Typically, the crates can be made from a plastics material or other suitable material such as metal or mesh or wood or even a board material or similar. The produce crates 7 are typically rectangular as shown.

Mounted within the chamber 1 is at least one inflatable/deflatable balloon seal means 15. In the example shown, there are multiple inflatable/deflatable balloon seal means 15. In the example shown, the inflatable/deflatable balloon seal means 15 comprise multiple upright extending elongate socks. Whilst upright extending socks have been shown, the inflatable/deflatable balloon seal means 15 may comprise other arrangements such as laterally horizontally extending concertina type balloon seal means or similar. The inflatable/deflatable balloon seal means 15 are connected with an upper plenum 17 that is also inflatable/deflatable in a balloon like manner. The socks and the plenums shown are typically manufactured from a synthetic plastics material sheet such as a material known by the trade name Nylon 210. Another suitable material is known by the trade name Cambacon. The sheet is formed into ducts to provide the socks and the plenums. Other suitable materials may be utilised such as rubberised canvas or synthetically treated canvas or similar substitutes such as plastics sheets. Typically, the Nylon 210 sheets are approximately 1 mm in thickness and are thus quite flexible and will naturally assume a deflated condition unless inflated by a controlled atmosphere. Other thicknesses are possible provided they allow the plenums and socks to collapse and to be inflated.

Figure 4:
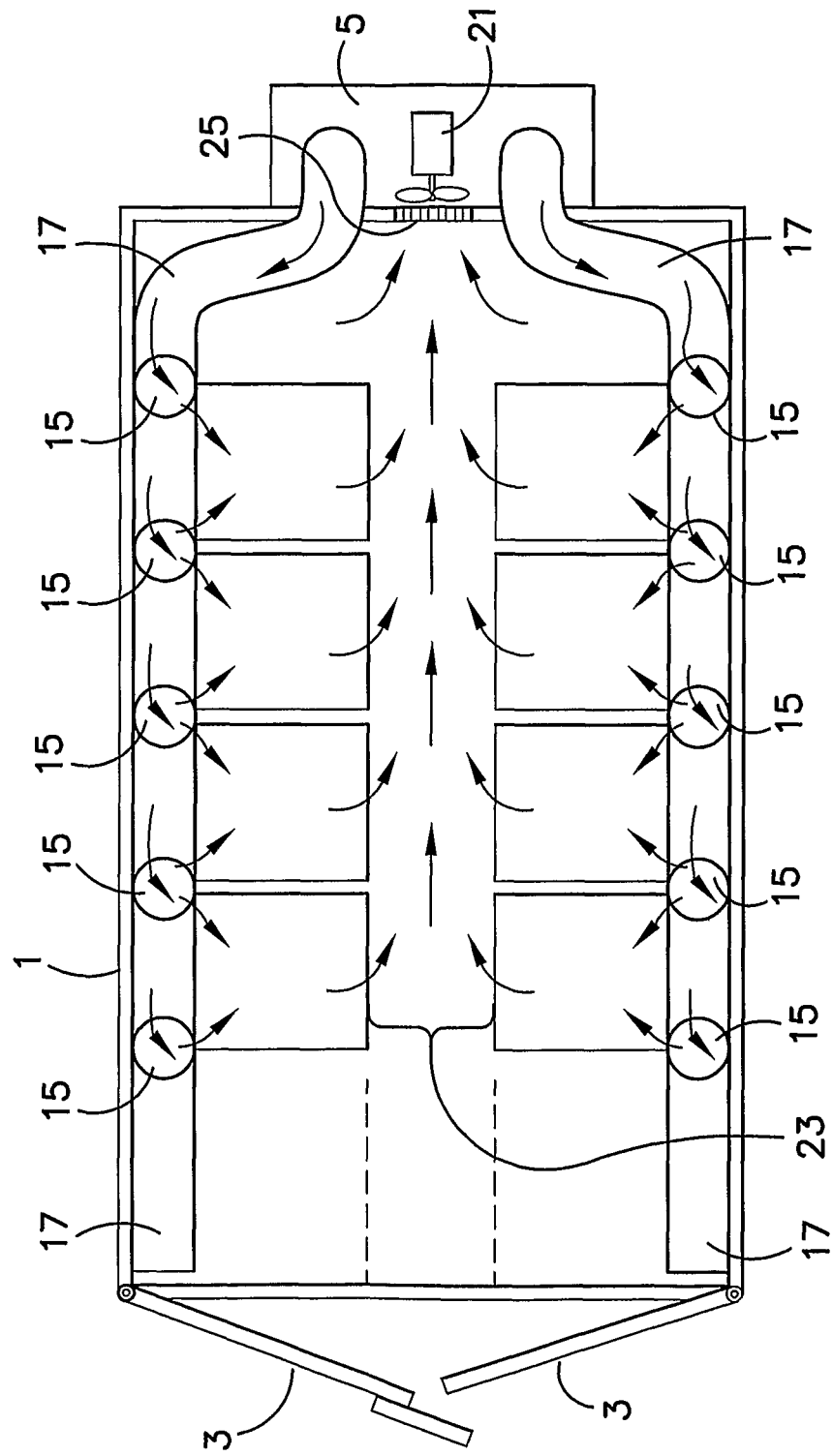
FIG. 4 is a plan view of the produce chamber shown in the previous figures.
Figure 5:
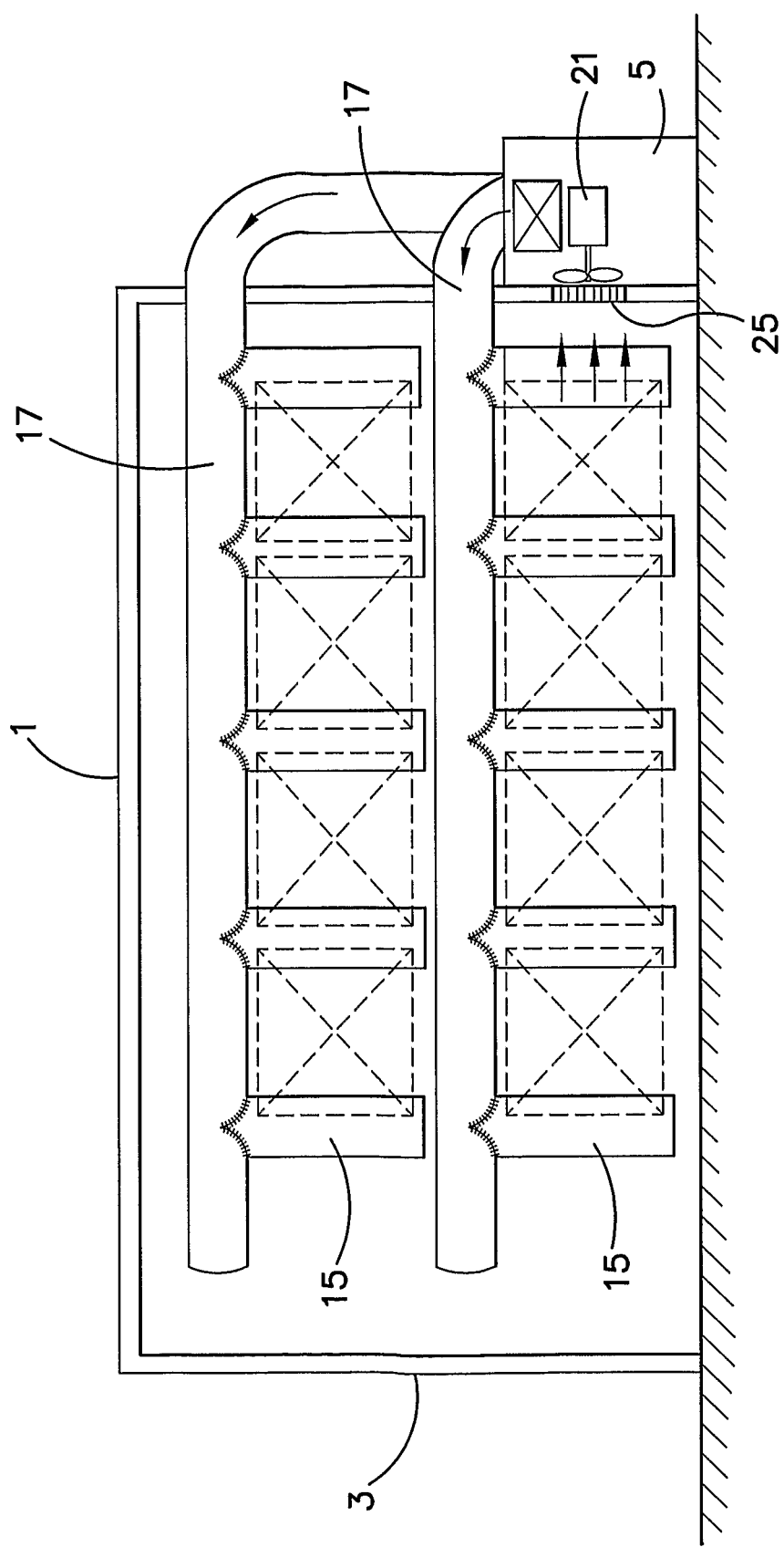
FIG. 5 is a side elevation of the produce chamber shown in previous figures.

In the example, it can be seen that there is inflatable/deflatable balloon seal means 15 at each side wall of the chamber 1 in a first tier, and a similar arrangement in a second tier. The plenums 17 connect with the controlled atmosphere circulating means 5, as best shown in FIGS. 4 and 5.

Each of the inflatable/deflatable balloon seal means 15 is spaced apart by the width of a produce crate 7 so that when a plurality of produce crates are located in the chamber 1, one sock of the inflatable/deflatable balloon seal means 15 will engage with side walls of corners of two adjacent produce crates. This is best shown in FIG. 4, and partly shown in FIG. 5.

Figure 2:
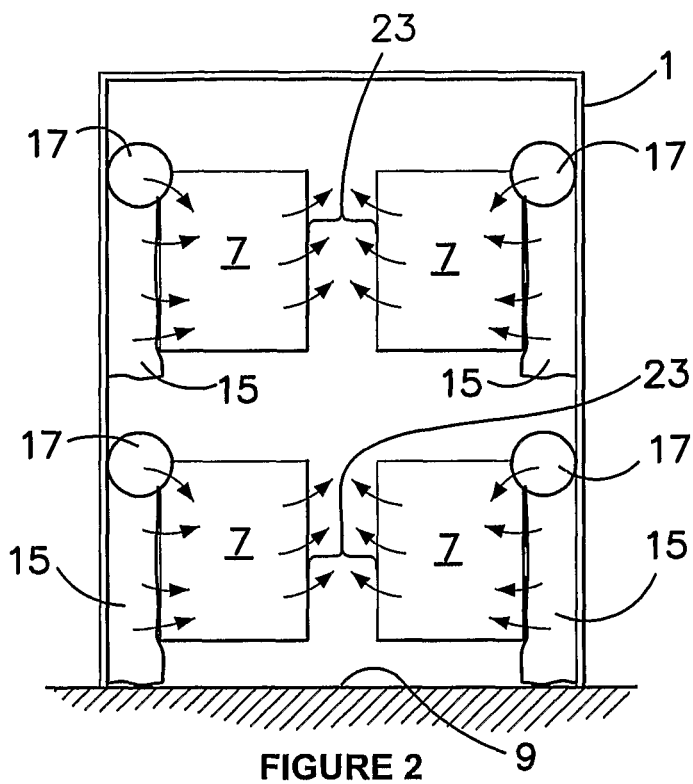
FIG. 2 is an end elevation of the produce chamber shown in FIG. 1 showing inflatable/deflatable balloon seal means in a inflated condition and sealing against produce crates in tiers.
Figure 3:
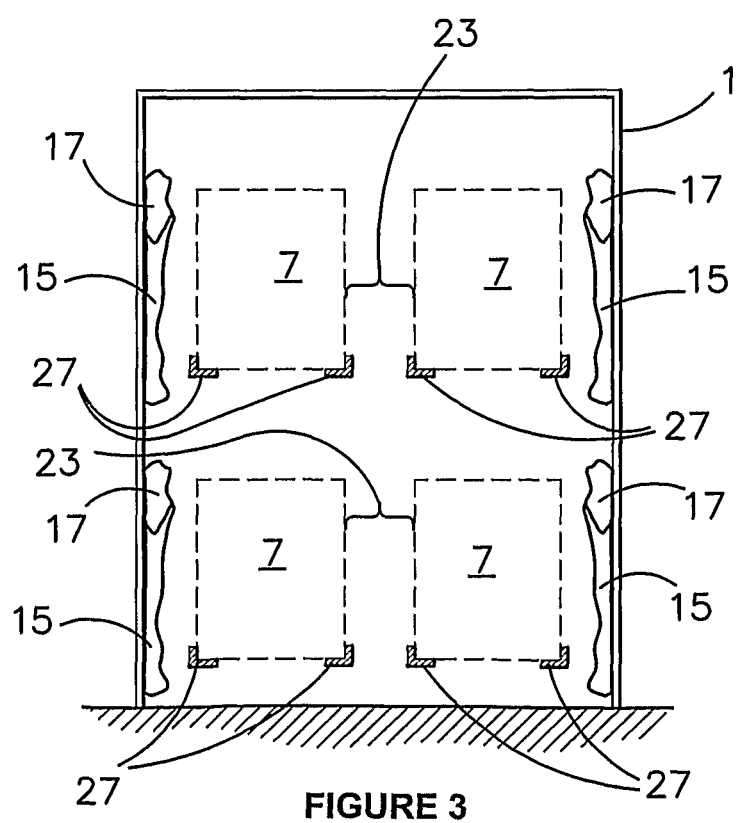
FIG. 3 is a view similar to FIG. 2 but showing the inflatable/deflatable balloon seal means in a deflated condition.

FIGS. 2 and 3 show how the inflatable/deflatable balloon seal means 15 can be inflated to engage with side walls 11 of the produce crates 7. FIG. 3 shows the inflatable/deflatable balloon seal means 15 and the plenum 17 in a deflated condition and not engaging with any of the side walls 11 of the produce crates 7. Accordingly, in order to load and/or remove produce crates from the chamber 1, the inflatable/deflatable balloon seal means 15 and plenums are collapsed which then provides free access and movement of the crates 7. When the crates 7 are positioned within the chamber 1, then the inflatable/deflatable balloon seal means 15 and the plenums 17 can be inflated so they will engage with the side walls 11 of the produce crates 7 as shown. The socks that form part of the inflatable/deflatable balloon seal means 15 have at least one discharge opening 19 therein. This is shown only in FIG. 1 where each sock has multiple discharge openings 19. The plenums 17 are also shown with discharge openings 19. When the produce crates 7 are located correctly within the chamber 1, and the inflatable/deflatable balloon seal means 15 and the plenums 17 inflated, they will engage with the respective side walls 11 of the produce crates and with the upper edge surface of the produce crates respectively. This is diagrammatically shown in FIGS. 2 and 4. Because the ducts that form the plenum 17 connect with the controlled atmosphere circulating means 15, then an atmosphere pressure can be supplied to the plenum 17 and to the inflatable/deflatable balloon seal means 15 by reason of a circulating fan 21 within the controlled atmosphere circulating means 5. It can be seen that each sock forming the inflatable/deflatable balloon seal means 15 engages with upright corner edges of each of the produce crates 7, and the discharge openings 19 are such that the controlled atmosphere passes therefrom and into and the aligned openings 13 of the produce crates 7 so that the controlled atmosphere will forcibly pass through the produce crates 7, and expose the produce therein to the controlled atmosphere. This is diagrammatically shown in FIGS. 2 and 5 by the flow arrows that show atmosphere flow paths.

In the example shown, there are two rows of produce crates 7 within the chamber 1. The walls within the chamber 1 therefore provide reactive surfaces for the upright socks and plenums to inflate against and to permit an inflating sealing force to be applied from the socks and the plenums 17 to the side walls of the crates 7. Whilst in the example shown, the walls comprise the walls of the chamber 1 itself, there may be independent wall surfaces provided within the chamber 1 for this purpose. The extreme ends of each of the socks and the plenums are sealed closed so that the controlled atmosphere passes only through the discharge openings 19 into the chamber and through the crates 7.

In the example shown, it can be seen that the there is a right hand side arrangement of inflatable/deflatable balloon seal means 15 and plenum 17, and a mirror image on the left hand side so rows of produce crates 7 can be held in the chamber positioned relative to each of the side walls. It can also be seen that there is a controlled atmosphere return passage 23 between the faces of the side walls of the produce crates 7 that directly face each other. This is shown in FIGS. 2, 3 and 4. The controlled atmosphere circulating means 5 has an intake 25 in line with the return passage 23. Accordingly, in use, the controlled atmosphere is circulated within the chamber 1 by being pressurised by the fan 21 so that it passes up through the ducts that form the plenums 17 and then into the socks that form the inflatable/deflatable balloon seal means 15. The controlled atmosphere then passes through the discharge openings 19 into the openings 13 in the crates and then through the crates, exposing the produce therein to the controlled atmosphere. The controlled atmosphere then forcibly passes through the crates through openings on the opposite side faces and into the return passage 23 and then back into the controlled atmosphere circulating means 15 as shown by the atmosphere flow arrows.

FIG. 3 shows guide means 27 in each of the tiers for correctly locating the crates 7 relative to the inflatable/deflatable balloon seal means 15 and the plenums 17. The guide means are shown in this example as right angle elongate rails. This is merely one example of a suitable guide means 27. Typically, the guide means 27 can be built as racking within the chamber 1 and the crates 7 allowed to slide or otherwise move along the guide means 27 to correctly position the crates 7. End stops (not shown) may be provided at the extreme ends of the guide means 27 to locate the crates 17 at positive stop positions at the end of the chamber 1 adjacent the controlled atmosphere circulating means 5.

Figure 6:
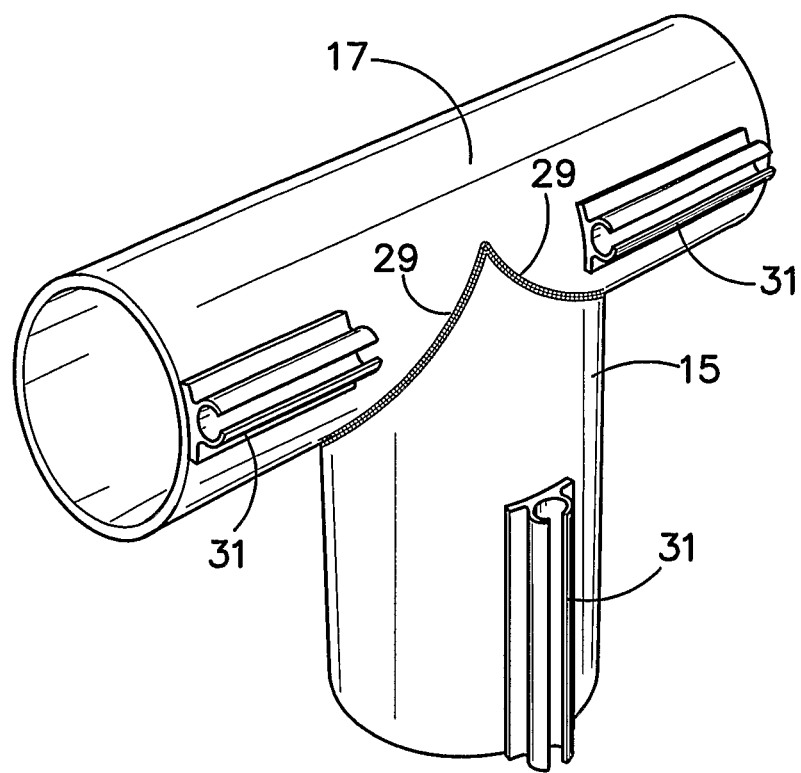
FIG. 6 is a close-up perspective view of a plenum and an upright extending elongate sock of a balloon seal means showing the way in which they are bonded together and the way in which they can be mounted to wall surfaces within the chamber.

FIG. 6 shows a close-up perspective view of the inflatable/deflatable balloon seal means 15 in the form of a sock, connecting with a plenum 17. The sock is high frequency welded to the plenum 17 along weld line 29, and a suitable opening is provided in the plenum 17 to allow controlled atmosphere to pass from the plenum 17 into the inflatable/deflatable balloon seal means 15. Other forms of bonding the socks to the plenums are not excluded.

Figure 8:
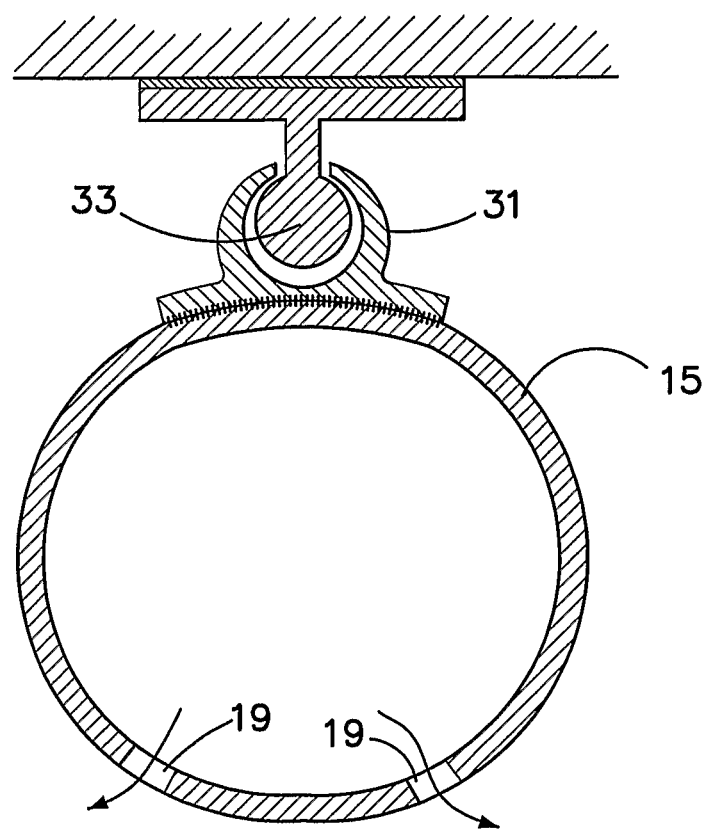
FIG. 8 is a transverse cross sectional view of a part of an upright extending sock of a balloon seal means showing mounting to a wall surface within the produce chamber.

FIG. 6 also shows a fastening system 31 to enable mounting of the inflatable/deflatable balloon seal means 15 and plenums 17 relative to the chamber 1. Here, elongate 'C' connectors similar to yacht sail connectors are bonded to the surfaces of the inflatable/deflatable balloon seal means 15 and the plenum 17. These may be in short lengths as shown or in continuous lengths. FIG. 8 shows how the 'C' shaped connectors connect with a beaded support 33 that is fastened to the walls within the chamber 1 by a suitable fastening medium or means. Typically, the fastening system 31 and beaded support 33 can be formed of a plastics material.

Figure 7:
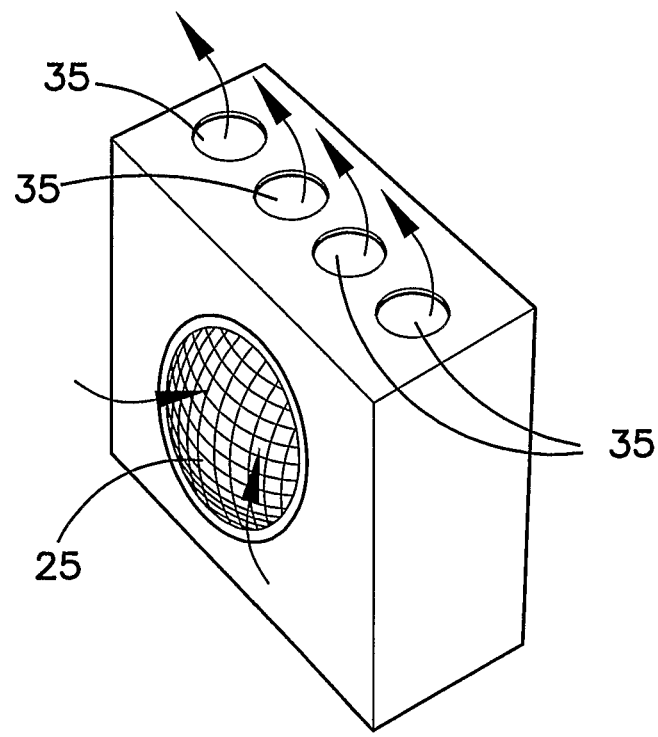
FIG. 7 is a top perspective view showing a controlled atmosphere air circulator for use with the chamber shown in the previous figures.

FIG. 7 is a top perspective view of the casing of the controlled atmosphere circulating means 5. The casing has four outlets 35 to which the ducts of the plenum 17 connect. In this case, there are four outlets being for each of the four plenum ducts. The casing of the controlled atmosphere circulating means 5 contains the intake 25 previously referred to.

It should be appreciated that the above example provides a produce chamber for subjecting produce in crates to a controlled atmosphere and dispenses with the need to provide a blind or tarp over each layer as the controlled atmosphere is forcibly directed through the produce crates by reason of the balloon seal means.

The controlled atmosphere may be any suitable atmosphere needed for enhancing the keeping/ripening or conditioning of produce. For example, the controlled atmosphere circulating means 5 may be a high humidity air processing apparatus. In other instances, it may be an apparatus that circulates a specialised gas for ripening of the produce such as ripening of bananas. The produce need not necessarily be vegetables or fruit but may be flowers or other similar produce. It is contemplated that the produce will be holdable within the crates 7 so there will be intercites between adjacent products stacked within the crates 7 so that the controlled atmosphere can forcibly freely pass through the crates and the produce to expose substantially all the surfaces of the produce to the controlled atmosphere.

Whilst there have been shown two rows of produce crates 7 within the chamber 1, the arrangement may be such that there is only one crate 7 within the chamber. In another example, there may be multiple rows of crates 7. Further, whilst there have been shown two tiers of crates 7, it should be understood that there may be only a single tier, or multiple tiers. Further, it should be appreciated that the inflatable/deflatable balloon seal means may be independently inflated or deflated relative to the passage of the controlled atmosphere. In other words, there may be a separate inflating/deflating circuit, independent of any circulating controlled atmosphere. The disclosed arrangement where the controlled atmosphere actually inflates the inflatable/deflatable balloon seal means 15 provides for a relatively economic system. If any of the socks or plenums 17 should rupture, then they can be economically replaced.

These and other modifications may be made without departing from the ambit of the invention the nature of which is to be determined from the foregoing description.

It is to be understood that, if any prior art publication is referred to herein, such reference does not constitute an admission that the publication forms a part of the common general knowledge in the art in any country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A produce chamber for subjecting produce in a produce crate to a controlled atmosphere, said chamber comprising:
at least one inflatable/deflatable balloon seal means for sealingly engaging with a side wall of a produce crate, the produce crate having at least one opening in the side wall to allow controlled atmosphere to be introduced to the produce crate,
the balloon seal means having at least one atmosphere discharge opening therein to align with the at least one opening in the produce crate when the produce crate is located in the chamber;
the balloon seal means being arranged so that when a produce crate with produce therein is to be introduced into the chamber, the balloon seal means can be deflated, the produce crate located in the chamber, and then the balloon seal means inflated and controlled atmosphere allowed to discharge into the chamber through the balloon seal means, so that the balloon seal means will inflate and seal against the side wall of the produce crate and so that the controlled atmosphere can be discharged from the at least one discharge opening through the at least one opening in the side wall of the produce crate to expose produce therein to the controlled atmosphere; and
an atmosphere circulating means for circulating controlled atmosphere away from the produce crate,
the balloon seal means comprising at least two upright extending elongate socks spaced apart by the width of a produce crate so that when a plurality of produce crates are located in the chamber, one sock will engage with side walls of corners of two side by side adjacent produce crates, and each sock has at least two discharge openings disposed at an angle relative to each other in the circumference of the sock, each discharge opening arranged to direct the circulating controlled atmosphere to a respective one of the two adjacent produce crates.

2. A chamber as claimed in claim 1, wherein said at least two upright elongated socks are positioned adjacent a wall in said chamber, said wall acting as a reactive surface for the upright socks to inflate against and to permit an inflating sealing force to be applied from the upright socks to the side walls of the produce crates.

3. A chamber as claimed in claim 1, wherein the at least two upright elongated socks are connected with an inflatable horizontally extending plenum positioned to seal against an upper edge surface of the produce crates, so when controlled atmosphere is introduced to said plenum said plenum will inflate and cause said plenum to seal against the upper edge surface of said crates and so controlled atmosphere can pass from said plenum into said upright socks to inflate said upright socks to seal against side edges of said produce crates.

4. A chamber as claimed in claim 2, wherein said at least two upright elongated socks are positioned adjacent respective opposed side wall in said chamber so rows of produce crates can be held in said chamber adjacent each opposed side wall, and there being a controlled atmosphere return passage between the faces of the side walls of said produce crates that face each other.

5. A chamber as claimed in claim 4, wherein said at least two upright elongated socks positioned adjacent respective opposed side wall are replicated in multiple layers in the chamber, so multiple layers of produce crates can be held in said chamber one above the other and each produce crate is subjected to said controlled atmosphere in each layer.

6. A chamber as claimed in claim 1, comprising guide means for locating said produce crate in said chamber.

7. A chamber as claimed in claim 1, wherein said produce is bananas.

8. A method of subjecting produce to a controlled atmosphere in a produce chamber comprising:
  locating produce in a produce crate in said chamber;
  inflating an inflatable/deflatable balloon seal means comprising at least two upright extending elongate socks to engage and seal with a side wall of the produce crate, said at least two elongate socks being spaced apart by the width of a produce crate so that when a plurality of produce crates are located in the chamber, one sock will engage with side walls of corners of two side by side adjacent produce crates, and each sock comprising at least two discharge openings disposed at an angle relative to each other in the circumference of the sock, each discharge opening arranged to direct the circulating controlled atmosphere to a respective one of the two adjacent produce crates;
  allowing controlled atmosphere to pass into the balloon seal means and through the discharge openings therein and then through an aligned opening in a side wall of said produce crate to expose the produce therein to said controlled atmosphere;
  circulating controlled atmosphere away from the produce crate; and
  deflating the balloon seal means to break the seal with the side wall of the produce crate and subsequently removing the produce crate and produce from the chamber.

9. A method as claimed in claim 8, comprising positioning the at least two upright elongate socks adjacent a wall in said chamber, and using said wall as a reactive surface for the upright socks to inflate against and permitting a sealing force to be applied from the upright socks to the side walls of the produce crates.

10. A method as claimed in claim 9, comprising inflating an inflatable horizontally extending plenum connected with said upright socks to seal against an upper edge surface of the produce crates by introduction of a controlled atmosphere into said plenum, and allowing said controlled atmosphere to pass from said plenum into said upright socks to inflate said upright socks to seal against side edges of said produce crates.

11. A method as claimed in claim 9, comprising moving the controlled atmosphere from said chamber through a return passage between faces of the side walls of the produce crates that face each other.

12. A method as claimed in claim 10, comprising introducing multiple layers of produce crates into said chamber one above the other and subjecting each layer of crates to a controlled atmosphere by discharge of the controlled atmosphere from the respective socks and plenums in each respective layer.

* * * * *